(12) United States Patent
Bailly et al.

(10) Patent No.: US 9,882,374 B2
(45) Date of Patent: Jan. 30, 2018

(54) LIGHTNING PROTECTION COMPONENT

(71) Applicant: SAGEM DEFENSE SECURITE, Boulogne Billancourt (FR)

(72) Inventors: Eric Bailly, Boulogne Billancourt (FR); Jean-Christophe Riou, Boulogne Billancourt (FR)

(73) Assignee: Sagem Defense Securite, Boulogne Billancourt (FR)

( * ) Notice: Subject to any disclaimer, the term of this patent is extended or adjusted under 35 U.S.C. 154(b) by 311 days.

(21) Appl. No.: 14/440,573

(22) PCT Filed: Nov. 5, 2013

(86) PCT No.: PCT/EP2013/073085
§ 371 (c)(1),
(2) Date: May 4, 2015

(87) PCT Pub. No.: WO2014/072300
PCT Pub. Date: May 15, 2014

(65) Prior Publication Data
US 2015/0303684 A1    Oct. 22, 2015

(30) Foreign Application Priority Data

Nov. 6, 2012 (FR) .................... 12 60536

(51) Int. Cl.
*H02H 9/04* (2006.01)
(52) U.S. Cl.
CPC .............. *H02H 9/04* (2013.01); *H02H 9/041* (2013.01)

(58) Field of Classification Search
CPC ................................ H02H 9/04; H02H 9/041
See application file for complete search history.

(56) References Cited

U.S. PATENT DOCUMENTS

| | | | |
|---|---|---|---|
| 3,600,634 A | 8/1971 | Muench, Jr. | |
| 3,858,089 A | 12/1974 | Poindexter | |
| 5,321,575 A | 6/1994 | Shilo | |
| 5,946,176 A * | 8/1999 | Ghoshal | H01H 59/0009 29/622 |
| 6,813,122 B1 * | 11/2004 | Granstrom | G11B 5/40 360/128 |
| 7,639,462 B2 * | 12/2009 | Graebel | H02H 9/046 324/537 |

(Continued)

FOREIGN PATENT DOCUMENTS

| | | |
|---|---|---|
| EP | 0 472 405 A2 | 2/1992 |
| GB | 1 301 034 | 12/1927 |
| WO | WO 2007/006021 | 1/2007 |

*Primary Examiner* — Scott Bauer
(74) *Attorney, Agent, or Firm* — Muncy, Geissler, Olds & Lowe, P.C.

(57) ABSTRACT

A lightning protection component, with at least one main input capable of transmitting a lightning signal, at least one main output designed to be connected to a piece of equipment (T) to be protected from the lightning signal, a branched output designed to be connected to a dissipation circuit (M), a direct line connecting the main input to the main output, a bypass circuit that is mounted between the direct line and the branched output, and that is provided with at least one bypass switch having an open state in which the branched output is isolated from the direct line and a closed state in which the lightning signal is conducted from the direct line to the branched output.

10 Claims, 1 Drawing Sheet

(56) References Cited

U.S. PATENT DOCUMENTS

| | | | | |
|---|---|---|---|---|
| 7,944,655 | B2* | 5/2011 | Chen | H01H 59/0009 361/56 |
| 2002/0005341 | A1* | 1/2002 | Seki | H01H 59/0009 200/181 |
| 2003/0132824 | A1* | 7/2003 | Ma | B81B 3/007 335/78 |
| 2010/0014199 | A1* | 1/2010 | Kawa | H01L 27/0251 361/56 |
| 2011/0188162 | A1* | 8/2011 | Wetter | H02H 9/041 361/57 |
| 2012/0176711 | A1* | 7/2012 | Farbarik | H02H 9/046 361/56 |
| 2013/0063025 | A1* | 3/2013 | Imai | H01T 4/12 313/581 |
| 2014/0049864 | A1* | 2/2014 | Brodsky | H02H 9/046 361/56 |

* cited by examiner

LIGHTNING PROTECTION COMPONENT

BACKGROUND OF THE INVENTION

Field of the Invention

The present invention relates to a lightning protection component, intended to be interposed between electronic equipment that may be damaged by a lightning signal and a line that may be struck by lightning and may transmit a lightning signal toward the electronic equipment.

Brief Description of the Related Art

There are numerous lightning protection components comprising Zener power diodes, Transorb or TVS diodes or the like, designed to withstand voltages and currents of the magnitude of those generated by a lightning strike. A diode of this type is intended to be fitted between the line liable to be struck by lightning and an energy dissipation circuit, generally a ground. When the line is struck by lightning, the diode becomes conducting and transmits the lightning signal toward a dissipation circuit, generally a ground.

It has been found that these protective components affect the performance of certain types of electronic equipment located downstream of the component. This occurs, for example, when the line in question connects sensors to a measurement circuit. In this case, owing to the characteristics of the components, leakage currents are induced at a relatively high temperature. Depending on the expected downstream metrological performance levels, these leakage currents may give rise to voltage errors which will degrade the measurement. This is the case, notably, in differential measurement circuits which use, for example, an instrumentation amplifier or a function for finding the analog difference between two functions.

SUMMARY OF THE INVENTION

One object of the invention is to propose a lightning protection component which does not adversely affect the performance of the equipment connected to it, and which achieves this result in a generic way, regardless of the type of input, which may be:
  analog, whether differential or otherwise, connected to sensors or sources of voltage or current of any kind;
  digital, in contact with TTL, CMOS, LVDS or other signals;
  differential buses of the 1553, CAN, VAN or other type; or
  power signals.

To this end, a lightning protection component is provided according to the invention, comprising at least one main input capable of transmitting a lightning signal, at least one main output for connection to equipment to be protected from the lightning signal, a branch output for connection to a dissipation circuit, a direct line connecting the input to the main output, and a branch circuit which is fitted between the direct line and the branch output and which is provided with at least one branch switch having an open state in which the branch output is isolated from the direct line and a closed state in which the lightning signal is conducted from the direct line toward the branch output.

In its open state, the branch switch does not allow the passage of leakage current which might interfere with the operation of the equipment connected to the component, but in its closed state it enables the lightning signal to be discharged. Thus protection is provided for the equipment, but there is no interference with the operation of the equipment when there is no lightning strike.

Preferably, the component comprises a circuit for detecting an operating state of the branch circuit, the detection circuit comprising means for verifying the correct closure of the switch and the flow of charges in the switch.

Preferably, the detection circuit can be interrogated by the system and also by the equipment, which is protected at all times. The operating state of a branch circuit of this type is easily detected, owing to the presence of the branch switch; it is simply necessary to verify the closure and conduction of this switch.

The detection device also advantageously comprises an input/output link for connection to the equipment to be protected.

The equipment may then cause the operating state to be verified, and may receive information representative of this state.

According to a specific embodiment of the branch circuit, the branch circuit comprises a control line, which runs between a secondary input, for connection to a low voltage source, and a control input of the branch switch, and which is provided with a control switch having a high-voltage control input connected to the direct line.

In this case, the control switch is closed directly by the lightning signal, and this closure then results in the closure of the branch switch. This makes the branch circuit relatively simple.

According to a first embodiment of the component, at least one of the switches is a microelectromechanical system enclosed in a cavity with a gas at constant controlled pressure, and the microelectromechanical system preferably comprises a moving contact forming the control input and two fixed electrodes, the moving contact being arranged so as to be moved from a position separated from the electrodes to a position in contact with the electrodes, under the action of an electrostatic force generated by a voltage present in the control input.

Advantageously, the gas is an ionizable gas, which becomes conducting when a sufficient voltage is applied to it, and helps to speed up the movement of the moving contact. The ionized gas is preferably kept in conditions, more particularly pressure conditions, such that the sufficient voltage is approximately one third of the voltage of the lightning signal.

According to a second embodiment of the component, the switch comprises two electrodes positioned in an enclosure containing an ionizable gas and separated from one another by said gas, in such a way that the switch is closed by a breakdown caused by the application of a voltage above a predetermined threshold, which lies between a nominal supply voltage of the equipment and a lightning voltage.

Under the effect of the voltage, the gas is converted to a conductive plasma, allowing charges to be conducted between the two electrodes. Since the separation between the electrodes is fixed and the pressure of the ionizable gas is controllable, this type of switch forms a physical barrier, providing protection without electrical leakage, as long as the voltage is below the predetermined threshold. This type of switch is particularly advantageous, because it can be installed on any type of electrical link such as a digital bus, a power bus, a differential bus (of the 1553 or other type), or analog inputs. The breakdown voltage can be adjusted simply by means of the design of the cavity formed by the electrodes, owing to the use of silicon and associated machining systems (DRIE machining, sacrificial machining, chemical etching, or other systems) and the gas pressure. The breakdown voltage may be relatively low, up to 1 volt for example. At the same time, the switch may form a capacitor having a very small capacitance (pF) and a relatively small size, while being highly stable in respect of voltage and temperature, which may be placed as closely as possible to the electronic components, or even directly at the inputs of these components on the same substrate, enabling said components to be decoupled. The service life of the switch is relatively long by comparison with commercially available spark gaps, since the cavities are formed from a vertical structure which allows a volume flow of the charges, instead of a surface flow.

The facing surfaces of the electrodes are preferably corrugated.

The corrugated geometry of the electrodes forming the walls of the cavity (this geometry being produced by DRIE machining, for example) provides multiple discharge points between the two electrodes, and these points will vary as a result of the removal of material occurring over time.

Advantageously, the component has a plurality of switches mounted in series and/or in parallel.

Lightning discharges flow away through a network of switches, which may or may not be linked by resistances. In this way, the current to be discharged can be distributed among a plurality of switches, thereby reducing the stress to which each switch is subjected.

Other characteristics and advantages of the invention will be evident from the following description of non-limiting specific embodiments of the invention.

BRIEF DESCRIPTION OF THE DRAWINGS

Reference will be made to the attached drawings, in which.

DETAILED DESCRIPTION OF THE PREFERRED EMBODIMENTS

Figure 1:
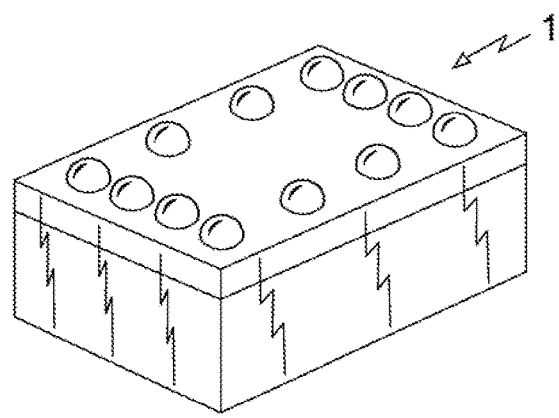
FIG. 1 is a schematic view of a component according to the invention.
Figure 2:
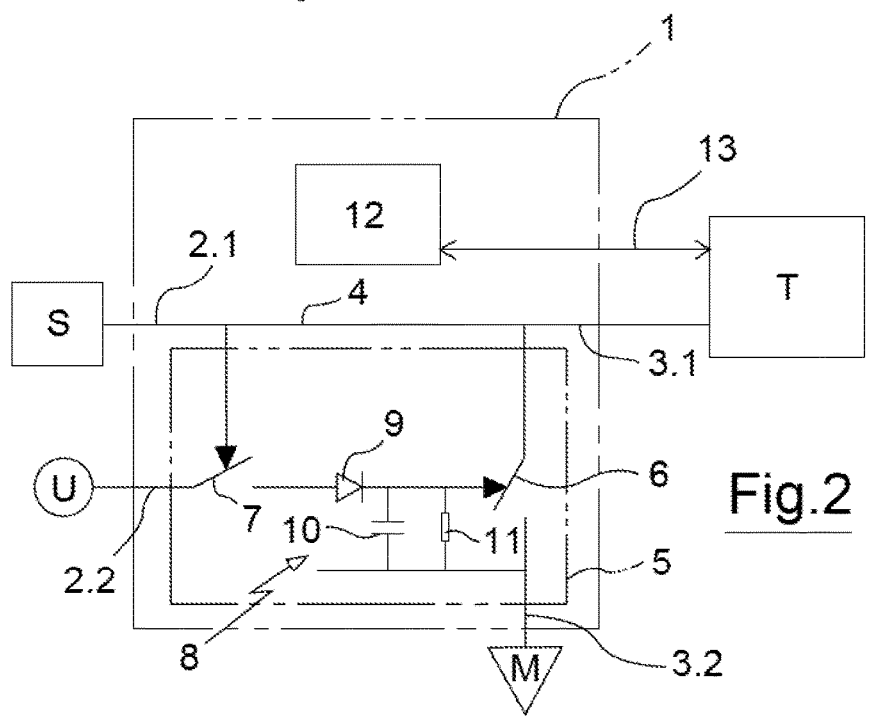
FIG. 2 is a circuit diagram of this component.

With reference to the figures, the lightning protection component according to the invention, generally indicated by the number 1, is in this case mounted between a sensor S and equipment T for processing analog electrical signals received from the sensor S. The sensor S, of a known type, is for example a position sensor for sensing the position of a movable element, and the processing equipment T, also of a known type, comprises for example an instrumentation amplifier and means for using the electrical signals received from the sensor C in order to control a motor for moving the movable element, for example. This case is purely an example, and other applications are evidently possible.

The component 1 is a surface mount component (SMC) arranged in the form of integrated circuits assembled in three dimensions (that is to say, the components are placed and connected vertically and horizontally) and passive electronic elements, mounted on a substrate and incorporated in a casing (this architecture is commonly referred to as "SiP", an abbreviation of the English term "system in package"). The SiP in question may also incorporate other integrated circuits, passive components and other elements, used for functions other than the present lightning protection function.

In this case, the component 1 comprises a main input 2.1 connected to the sensor S and capable of transmitting a lightning signal, a secondary input 2.2 connected to a low voltage source u, a main output 3.1 connected to the processing equipment T to be protected from the lightning signal, and a branch output 3.2 connected to a dissipation circuit of a known type, in this case a ground M. The inputs 2.1, 2.2 and outputs 3.1, 3.2 are provided with contacts in the form of balls arranged in an array (BGA) on an outer surface of the substrate of the component 1. The substrate of the component 1 incorporates the lightning protection switches.

The component 1 further comprises a direct line 4 connecting the main input 2.1 to the main output 3.1, and a branch circuit, indicated generally by the number 5, which is mounted between the direct line 4 and the branch output 3.2.

The branch circuit 5 comprises a branch switch 6 which is connected to the direct line 4 and to the branch output 3.2, and which has an open state in which the branch output 3.2 is isolated from the direct line 4 and a closed state in which the lightning signal is conducted from the direct line 4 toward the branch output 3.2.

The branch circuit 5 comprises a control line including a control switch 7 connecting the secondary input 2.2 to a control input of the branch switch 6 via a delay circuit, generally indicated by the number 8, arranged to close the branch switch for a predetermined period. It should be noted that, in an advanced version, the delay circuit 8 may be made adjustable by the system or equipment to be protected.

The control switch 7 has a high-voltage control input connected to the direct line 4.

The waveforms of the lightning signal handled by this protection system are those currently encountered in aeronautics, namely (according to the DO160 standard, Section 22 and 23):

waveform 3/single pulse: damped sine wave with frequency F=10 MHz,
the open circuit voltage is 1500 V,
the short-circuit current is 60 A.
waveform 4/single pulse: rise time Trise=6.4 μs and fall time Tfall=69 μs,
the open circuit voltage is 750 V,
the short-circuit current is 150 A.
waveform 5A/single pulse: rise time Trise=40 μs and fall time Tfall=120 μs,
the open circuit voltage is 750 V,
the short-circuit current is 150 A.
Regarding the lightning tests, it should be noted that:
The lightning generator for testing the protection is adjusted on a load so as to be capable of generating, for example, 60 A at 1500 V in a damped sine wave at 10 MHz (waveform 3). This signal is then sent to the protection system, and, depending on the impedance of the latter, either the voltage or the current will dominate the exchange.
The three waveforms 3, 4, and 5A are not present at the same time. Generally, two waveforms coexist in a lightning attack (waveforms 3 and 5A or waveforms 4 and 5A, for example).

The control switch 7 is arranged in such a way that the control switch 7 is closed when the control input is subjected to an intermediate voltage between the voltage of the signals supplied nominally by the sensor S (less than one volt, for example) and the voltage of a lightning signal (750 volts, for example). It should be noted that the switch 7 may be triggered on a positive or negative lightning interference. The voltage causing the closure of the control switch 7 is, for example, 200 volts. The delay circuit 8 comprises a diode 9 mounted in series between the control switch 7 and the control input of the branch switch 6, together with a capacitor 10 and a resistance 11 mounted in parallel with one another between the cathode of the diode 9 and the ground M. The delay circuit 8 is designed to keep the branch switch 6 normally closed during a period of one second, to ensure that all the charges of the lightning signal have been able to flow to the ground M via the branch switch 6.

In this case, the switches 6 and 7 are microelectromechanical systems enclosed in a cavity with a gas at constant controlled pressure. Preferably, the gas in question is a gas that can be ionized at the aforesaid voltage of 200 volts. The switches 6 and 7 may be formed by a plurality of MEMS switches connected in parallel and/or in series with one another and controlled by the same control signal. Each of these switches may be manufactured from silicon or any other alloy thereof, crystalline or otherwise (e.g. SiC, Si3N4, etc.). In a more economical version, the switches may also be made of liquid crystal polymer (or "LCP").

Each microelectromechanical system comprises a movable contact 20 forming the control input and two fixed electrodes 21, 22 separated from one another and connected to one of the sections of the line to be interrupted, namely the control line for the control switch 7 and the branch line connecting the direct line 4 to the branch output 3.2 for the branch switch 6. The movable contact 20 extends facing the fixed electrodes 21 and 22, and is carried by a deformable beam arranged to move from a position in which the movable contact is separated from the electrodes to a position in which the movable contact 20 is applied to the electrodes, under the action of an electrostatic force generated by a voltage present in the control input, namely the voltage of 200 volts for the control switch 7 and the voltage u for the branch switch 6. The movable contact is preferably made of thick gold (with a thickness of 1 µm or more) on nickel (with a thickness of 3 µm or more).

Evidently, if no lightning signal is present on the direct line 4, the switches 6 and 7 are open and the signals from the sensor S are routed via the direct line 4 to the processing equipment T. When a lightning signal is transmitted to the direct line 4, the control switch 7 is closed, causing the branch switch 6 to close, this closure being maintained for about one second. The lightning signal is then discharged by the branch line to the ground M. It is advantageous for the control circuit of the branch switch 6 to be as fast as possible relative to the period of the lightning signal (that is to say, approximately 0.1 µs), and for the input resistance of the processing equipment T to be high relative to the resistance of the branch line (the ratio being 1,000,000, for example). In the case of switches 6 and 7, the manufacturing technology and the materials used must therefore allow the attack caused by the lightning signal to be taken into account much more rapidly than the lightning signal itself (at least 100 times faster than the attack period). This requirement is therefore compatible with the characteristics of the switches described herein.

The component 1 according to the invention further comprises a circuit, shown schematically at 12, for detecting an operating state of the branch circuit 5.

The detection circuit 12 comprises means, of a known type for verifying the correct closure of switches 6 and 7 and the flow of charges in switches 6 and 7 in their closed state at high and low voltage respectively. The detection device comprises an input/output link 13 connected to the processing equipment T to be protected.

The detection circuit 12 is put into operation in response to a request sent to the detection circuit 12 by the processing equipment T via the input/output link 13. The detection circuit 12 is arranged to be isolated from the processing equipment T in this case, and to carry out the verification of closure and conduction. When these verifications have been performed, the detection circuit 12 reconnects to the processing equipment T and sends to the latter a signal representative of the operating state of switches 6 and 7.

In this case, the detection circuit 12 comprises:
a generator of direct current up to 1 A,
a high voltage generator, and
an AC/DC converter for measuring the presence of the voltage u and the value of the resistance of the switch 6.

The voltage generator enables the switch 7 to be operated during its control. The verification of correct operation is carried out by verifying that the voltage u is actually measured downstream of the switch 7 when it is closed. This adjustable generator is simply designed on the basis of transistors, diodes and passive components. It enables the triggering threshold of the switch 7 to be measured as a function of time, enabling the system to check the serviceability of the switch.

The current generator enables the resistance in the conducting state of switch 6 (Ron) to be measured. The isolation of this switch in the open state is checked by a fraction of the high-voltage generator described above.

Figures 3, 4, 5:
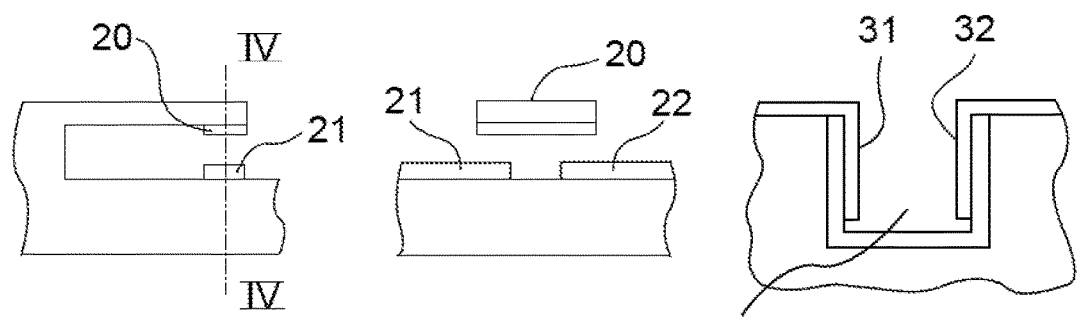
FIG. 3 is a schematic view in cross section, taken along a plane perpendicular to the electrodes, of one of the switches used in the component.
FIG. 4 is a schematic view in cross section, taken along the line IV-IV of FIG. 3, of this switch.
FIG. 5 is a schematic view in cross section of a variant embodiment of the switches used in the component.

In a variant, it is possible to use other types of switch, more particularly for switches 7, and notably, as shown in FIG. 5, a switch comprising two electrodes 31, 32 positioned in a sealed enclosure and separated from one another by a mixture of gases contained in the enclosure and filling a free space 33 extending between the electrodes 31, 32. The electrodes 31, 32 are each connected to a portion of the line to be interrupted in such a way that the switch is closed under the effect of a breakdown (avalanche) caused by the application of a voltage above a predetermined threshold, which lies between a nominal supply voltage of the equipment and a lightning voltage. In this case, the predetermined threshold is equal to one third of the expected voltage of the lightning signal. At least one of the electrodes preferably has a specific surface with controlled roughness, and a finish comprising, notably, thick nickel (with a thickness of 3 µm or more) and gold (with a thickness of 1 µm or more). In this case, the facing surfaces of the electrodes 31, 32 are corrugated.

The gas in this case is a gas which may be argon, air or any combination of these.

In the case of switch 7, the value of the high trigger voltage is expressed as follows:

$$Vb=[b*p*d]/[\text{Ln}(A*p*d)-\text{Ln}(\text{Ln}(1+1/\delta se))]$$

where Vb is the potential barrier,
a and b are constants depending on the gas,
P is the gas pressure in the cavity,
d is the inter-electrode distance, and
δse is the electrical emission coefficient (nature of the surfaces).

According to the Paschen curves, it is possible to achieve fairly low breakdown levels for a product P*d of the order of $5E^{-3}$ at $1E^{-4}$ bar·cm, which is compatible with MEMS technology. The minimum levels may also be varied from 326 V in air to 195 V in argon and 95 V in sodium-doped argon. Finally, MEMS technology enables the surface states of the electrodes to be modified so as to modulate the breakdown voltages downward.

In a conventional solid insulating material, the simple act of breakdown soon causes damage to the material (partial discharges) and eventually leads to a total rupture of the barrier. The advantage of using gases is that the avalanche phenomenon is fully reversible when desired, and the barrier is re-formed (auto-regeneration) when the voltage falls below the ionization threshold of the gas.

In this variant also, it is useful to provide a plurality of switches mounted in series and in parallel to distribute the current of the lightning signal among all these switches, thus limiting the stress on each of the switches.

Clearly, the invention is not limited to the embodiment described above, but incorporates all variants falling within the scope of the invention as defined by the claims.

In particular, the component may comprise switches of different types or switches of the same type.

The control circuit may be different from the circuit described.

Means of controlling the branch switch other than the control switch would be feasible.

The invention claimed is:

1. A lightning protection component, comprising at least one main input capable of transmitting a lightning signal, at least one main output for connection to equipment (T) to be protected from the lightning signal, a branch output for connection to a dissipation circuit (M), a direct line connecting the main input to the main output, and a branch circuit which is fitted between the direct line and the branch output and which is provided with at least one branch switch having an open state in which the branch output is isolated from the direct line and a closed state in which the lightning signal is conducted from the direct line toward the branch output,
wherein the at least one branch switch is a microelectromechanical system enclosed in a cavity with a gas at constant controlled pressure, and
wherein the microelectromechanical s stem comprises a moving contact forming the control input and two fixed electrodes, the moving contact being arranged so as to be moved from a position separated from the electrodes to a position in contact with the electrodes, under the action of an electrostatic force generated by a voltage present in the control input.

2. The component as claimed in claim 1, comprising a circuit for detecting an operating state of the branch circuit, the detection circuit comprising means for verifying the correct closure of the branch switch and the flow of charges in the branch switch.

3. The component as claimed in claim 2, wherein the detection circuit comprises an input/output link for connection to the equipment (T) to be protected.

4. The component as claimed in claim 1, wherein the branch circuit comprises a control line, which runs between a secondary input, for connection to a source of low voltage (u), and a control input of the branch switch, and which is provided with a control switch having a high-voltage control input connected to the direct line.

5. The component as claimed in claim 4, wherein the control switch is connected to the control input of the branch switch via a delay circuit arranged to close the branch switch for a predetermined period.

6. The component as claimed in claim 1, wherein the gas is a gas that can be ionized by a voltage smaller than the voltage of the lightning signal.

7. The component as claimed in claim 1, wherein the branch switch comprises two electrodes positioned in a sealed enclosure containing an ionizable gas and separated from one another by said gas, in such a way that the switch is closed by a breakdown caused by the application of a voltage above a predetermined threshold, which lies between a nominal supply voltage of the equipment and a lightning voltage.

8. The component as claimed in claim 7, wherein the gas comprises argon, air or any combination of these.

9. The component as claimed in claim 7, wherein the facing surfaces of the electrodes are corrugated.

10. The component as claimed in claim 1, comprising a plurality of switches mounted in series and/or in parallel.

* * * * *